United States Patent
Chu et al.

(10) Patent No.: US 7,236,533 B2
(45) Date of Patent: Jun. 26, 2007

(54) METHOD AND APPARATUS FOR REDUCING RATIO OF PEAK POWER TO AVERAGE POWER OF MULTI-CARRIER SIGNALS

(75) Inventors: Qing Chu, Shen Zhen (CN); Huabing Jiang, Shen Zhen (CN); Jing Wang, Shen Zhen (CN); Peng Li, Shen Zhen (CN)

(73) Assignee: Huawei Technologies Co., Ltd., Shen-Zhen (CN)

( * ) Notice: Subject to any disclaimer, the term of this patent is extended or adjusted under 35 U.S.C. 154(b) by 768 days.

(21) Appl. No.: 10/367,419

(22) Filed: Feb. 14, 2003

(65) Prior Publication Data

US 2004/0008795 A1    Jan. 15, 2004

Related U.S. Application Data

(63) Continuation of application No. PCT/CN01/01164, filed on Jul. 9, 2001.

(30) Foreign Application Priority Data

| Aug. 17, 2000 | (CN) | .............................. 00 1 19623 |
| Aug. 17, 2000 | (CN) | .............................. 00 1 19624 |

(51) Int. Cl.
    *H04K 1/10* (2006.01)
(52) U.S. Cl. ................ 375/260; 375/296; 375/346; 375/350; 375/316
(58) Field of Classification Search ............... 375/260, 375/296, 254, 346, 350, 316
See application file for complete search history.

(56) References Cited

U.S. PATENT DOCUMENTS

| 2001/0055320 | A1* | 12/2001 | Pierzga et al. | ............... 370/480 |
| 2002/0101936 | A1* | 8/2002 | Wright et al. | ............... 375/296 |

FOREIGN PATENT DOCUMENTS

| EP | 0 982 906 A2 | 3/2000 |
| GB | 2 343 311 A | 5/2000 |
| WO | WO 00/01084 | 1/2000 |

* cited by examiner

*Primary Examiner*—Mohammed Ghayour
*Assistant Examiner*—Leila Malek
(74) *Attorney, Agent, or Firm*—Dorsey & Whitney LLP

(57) ABSTRACT

A method and apparatus for reducing a ratio of peak power to average power of multi-carrier signals are provided. The apparatus and method include the steps of: after modulating the multi-carrier signals respectively, summing the modulated signals to form a combination signal; computing and searching on at least one of the carriers based on the combination signal to obtain the resultant compensation signal; and summing the resultant compensation signal with the combination signal from the combiner to produce a compensated signal. The method and apparatus effectively reduce the ratio of peak power to average power of the multi-carrier signals.

13 Claims, 3 Drawing Sheets

METHOD AND APPARATUS FOR REDUCING RATIO OF PEAK POWER TO AVERAGE POWER OF MULTI-CARRIER SIGNALS

CROSS-REFERENCE TO RELATED APPLICATION

This utility patent application is a continuation application and claims priority of the PCT International Patent Application, serial number PCT/CN01/01164, filed on Jul. 9, 2001, which claims the priority of the Chinese patent application, serial number CN 00119623.5, filed on Aug. 17, 2000 and the Chinese patent application, serial number CN 00119624.3, filed on Aug. 17, 2000; subject matter of which are incorporated herewith by reference.

FIELD OF THE INVENTION

The present invention relates to a digital communication system. More particularly, the present invention relates to a method and apparatus for reducing ratio of peak power to average power of multi-carrier signals in a digital communication system.

BACKGROUND OF THE INVENTION

In a digital communication system, more particularly, in a mobile communication system, looking for a high modulation method with excellent performance under a given channel condition is always an important task. For a radio frequency unit of a digital intermediate frequency transmitter, when modulation signals are maintained on a relatively constant voltage level, a radio frequency amplifier generally operates with the best efficiency. However, large power peaks of the modulation signals often cause the operation of a radio frequency amplifier with lower efficiency and worse linearity. Therefore, it is desired that in a radio frequency amplifier, the ratio of peak power to average power of modulation signals approximates to as 1 or Decibel of 0 db as possible. A digital intermediate frequency transmitter of a multi-carrier system is shown in FIG. 1, wherein digital multi-carrier signals are modulated by a baseband unit. After passing through an up-converter, the multi-carrier signals are inputted into a radio frequency unit via a DAC (digital-to-analog converter). If the ratio of peak power to average power of the multi-carrier signals is not limited requisitely by the multi-carrier system, the maximum power of the radio frequency amplifier in the radio frequency unit will be significantly larger than the average power in order to ensure no signal distortion and in order to prevent the spectrum spreading from occurring. This causes not only wasting of power at a radio frequency unit but also significant trouble in designing a radio frequency unit.

Currently, in a multi-carrier modulation method, several carriers are modulated in parallel by using several data streams. Combined signals of multi-carrier modulation of multi-user are formed at base stations. A digital intermediate transmitter is typically shared by the base stations, rather than having one transmitter for one carrier, to reduce cost.

However, the biggest disadvantage of the multi-carrier modulation method is that the combined signals have very high ratio of peak power to average power, that is, the maximum power of a radio frequency amplifier in a radio frequency unit is significantly larger than the average power. Typically, to prevent distortion and reduce the spectrum spreading, a large linear dynamic range of a radio frequency amplifier is required for amplifying the combined signals, which force the designers to use an amplifier with a large linear range, whereby the peak power is significantly larger than the average power of the combined signals. This significantly increases the cost of the multi-carrier system. Thus, under the premise of not decreasing the other performance specifications, a ratio of peak power to average power of the combined signals should be decreased as much as possible, and making the signals as having constant envelope or approximately constant envelope as possible is an objective of the designers.

An out-of-band compensation method has been proposed to improve the ratio of peak power to average power of the signals. The out-of-band compensation method is a method of producing a certain out-of-band compensation signal based on input signals, and adding the original signals with the compensation signal to obtain a combination signal that has an approximately constant envelope, or to obtain a reduced ratio of peak power to average power of the signals. It is desired that the power of the compensation signal and an error signal rate of the system are as small as possible, and that the combination signal also satisfies the requirements of communication system protocols. Because the compensation signal is added out-of-band, the effect on the original signals is small.

However, one of the disadvantages of the out-of-band compensation method is that when a large amount of compensations are required, the computation of a compensation signal is complicated and tedious. Also, sometimes a real time computation may be impossible. As a result, the ratio of peak power to average power of the signals may not be improved by the out-of-band compensation method. When the compensation is small, the improvement of the ratio of peak power to average power is limited. Thus, the out-of-band compensation method does not function well.

Another proposed method is a probabilistic waveform clipping method. The principle of this waveform clipping method is that when the amplitude of a signal is above a certain threshold, the amplitude of the signal is set to the threshold, and when the amplitude of a signal does not exceed this threshold, the amplitude of the signal does not change. Although reducing the peak power of the signals to a threshold level or below may help satisfy the requirement of the ratio of peak power to average power, the strength of the signals tends to be weak after the waveform clipping process. Also, the in-band noise will be increased which would affect the transmission of the signals accordingly. In order to increase an amplitude threshold of the waveform clipping, it is required that the power be increased significantly whereby the cost, the energy source, and the requirements on the other aspects of the system will also be increased. Thus, the application of the waveform clipping method is not practical.

Accordingly, it is desirable to provide a method and apparatus for reducing the ratio of peak power to average power of multi-carrier signals. The method and apparatus in accordance with the principles of the present invention not only ensure the signal quality, but also reduce the signal noise.

SUMMARY OF THE INVENTION

In order to realize the above objectives, the present invention provides a method for reducing the ratio of peak power to average power of multi-carrier signals. The method comprises the steps of: summing modulated multi-carrier signals to form a combination signal; computing and searching at least one of multi-carrier signals based on the combination signal to obtain a resultant compensation signal; and summing the resultant compensation signal with the combination signal to produce a compensated signal.

The above method for reducing the ratio of peak power to average power of the multi-carrier signals, further comprises the steps of: selecting a proper amplitude for waveform clipping; and performing probabilistic waveform clipping for the compensated signal to output a standard signal.

In the above method for reducing the ratio of peak power to average power of the multi-carrier signals, the steps for computing and searching at least one of multi-carrier signals based on the combination signal to obtain a resultant compensation signal comprise the steps of:

1) determining whether value of each sample point of the combination signal is within a predetermined permitted range, wherein for a constant envelope compensation, the predetermined permitted range is within a range of ±5% of a constant envelope value, and for the other compensations, the only requirement for the predetermined permitted range is that an absolute value of the sample point is smaller than a maximum value; for the sample point of the combination signal that is within the predetermined permitted range, assigning 0 to the value of the sample point of the corresponding compensation signal; and for the sample point of the combination signal that is not within the predetermined permitted range, the following calculation is performed;

2) calculating a first compensation signal to decide whether there is a solution, if there is, then using the first compensation signal as the resultant compensation signal to be summed with the combination signal for producing the compensated signal;

3) If there is no solution for the first compensation signal, then calculating a second compensation signal to decide whether there is a solution, if there is a solution, then using the second compensation signal as the resultant compensation signal to be summed with the compensation signal for producing the compensated signal; and 4) If there is still no solution for the second compensation signal, then performing a combination compensation via a searching method to produce the resultant compensation signal.

In the above method for reducing the ratio of peak power to average power of the multi-carrier signals, the step 4) of performing the combination compensation via the searching method comprises the steps of: changing an amplitude of the compensation signal of one of the carriers according to a predetermined step in a specified range and calculating simultaneously to determine whether there is a solution for another compensation signal. If there is a solution, then the another compensation signal is used as the resultant compensation signal to be summed with the combination signal to produce the compensated signal, and the combination compensation via the searching method is complete. If there is no solution, then the combination compensation via the search method continues until the amplitude of the compensation signal exceeds the range.

In the above method for reducing the ratio of peak power to average power of the multi-carrier signals, the step 4) of performing the combination compensation via the searching method comprises the steps of: calculating phases of a vector of the combination signal and a vector of the compensation signal of a first carrier at a certain sampling time; calculating phases of two reverse vectors; if the phase of the compensation signal of a second carrier is positioned between the two reverse vectors, then using the compensation signal of the second carrier as the resultant compensation signal to be summed with the combination signal to produce the compensated signal; otherwise, using a reverse signal of the compensation signal of the second carrier as the resultant compensation signal to be summed with the combination signal to produce the compensated signal.

In the above method for reducing the ratio of peak power to average power of the multi-carrier signals, the compensation signal is an amplitude modulation and phase modulation signal.

In order to realize the above objectives, the present invention also provides an apparatus for reducing the ratio of peak power to average power of the multi-carrier signals. The apparatus comprises: a modulator for modulating respectively the input multi-carrier signals and for outputting respective modulated signals; a combiner for receiving the respective modulated signals outputted from the modulator and performing summation to form a combination signal for outputting; a compensation generator for receiving the combination signal from the combiner to calculate and search on at least one carrier and forming a compensation signal for outputting; and a summer for summing the combination signal from the combiner with the compensation signal from the compensation generator and outputting a compensated signal.

The above apparatus for reducing the ratio of peak power to average power of the multi-carrier signals further comprises: a probabilistic waveform clipper for receiving the compensated signal from the summer, selecting a proper amplitude for waveform clipping to perform probabilistic waveform clipping for the compensated signal, and outputting a standard signal.

DETAILED DESCRIPTION OF THE PREFERRED EMBODIMENTS

Figure 1:
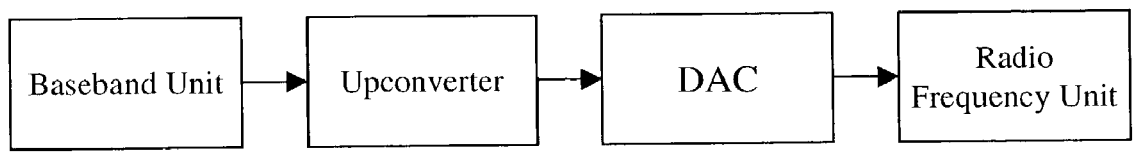
FIG. 1 is a block diagram of a prior digital intermediate transmitter.
Figure 2:
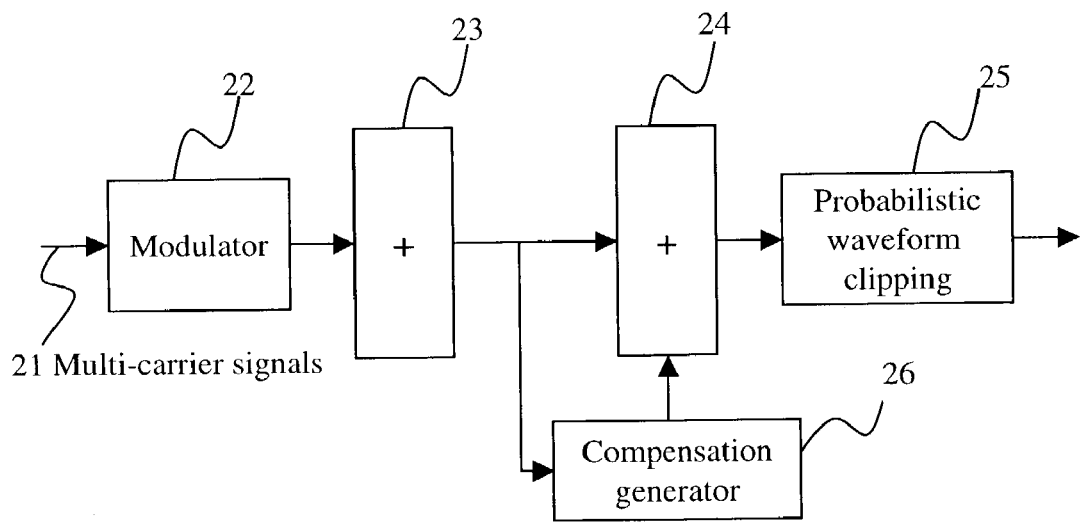
FIG. 2 is a block diagram of a digital intermediate transmitter having an apparatus for reducing ratio of peak power to average power of multi-carrier signals in accordance with the principles of the present invention.

As shown in FIG. 2, an apparatus of the present invention for reducing a ratio of peak power to average power of multi-carrier signals comprises: a modulator 22 for modulating input multi-carrier signals 21, respectively, and outputting the respective modulated signals; a combiner 23 for receiving the respective signals outputted from the modulator 22 and performing summation to form a combination signal for outputting; a compensation generator 26 for receiving the combination signal from the combiner 23 to calculate and search on at least one carrier, and forming a compensation signal for outputting; a summer 24 for receiving the combination signal from the combiner 23 and the compensation signal from the compensation generator 26, and performing summation to output a compensated signal; and a probabilistic waveform clipper 25 for receiving the compensated signal from the summer 24, selecting a proper amplitude for clipping to perform probabilistic waveform clipping for the compensated signal, and outputting a standard signal.

After the multi-carrier signals 21 pass through the modulator 22, they are summed in the combiner 23 to form a combination signal. The combination signal is input into the compensation generator 26 for calculating and searching the corresponding compensation signal. The compensation signal from the compensation generator 26 and the original combination signal from the combiner 23 are then summed in the summer 24. At this time, except a few of the sampled signal points may still not have a solution, most of the sampled signal points have reached a desired ratio of peak power to average power. At this time, the signals pass through the clipper 25, and the sampled signal points that do not have a solution are clipped. Because there are only a few of sampled signal points without a solution, the effect caused by clipping is far less than that of caused by a simple clipping. The original compensation method requires that the compensation signal be approximately a constant envelope. However, this requirement would cause the solving of the compensation signal to fail at a number of sampling signal points and to complicate the calculation. In the present invention, it is not required that the compensation signal be a signal with a constant envelope, but only required the compensated signal be a signal with approximately a constant envelope. Although the ratio of peak power to average power is higher than that of with the constant envelope, the amount of calculation decreases significantly, and the amplitude of the combination signal significantly reduces. Thus, the effect on the original input signals is also decreased. In order to reduce further the number of sampled signal points without a solution, a method of combination compensation of the compensation signals of two carriers is employed.

The method of the present invention for reducing a ratio of peak power to average power of multi-carrier signals comprises the steps of: summing modulated multi-carrier signals to form a combination signal; computing and searching at least one of multi-carrier signals based on the combination signal to obtain a resultant compensation signal; summing the resultant compensation signal with the combination signal to produce a compensated signal, and selecting a proper amplitude for performing probabilistic waveform clipping of the compensated signal for outputting a standard signal.

Figure 3:
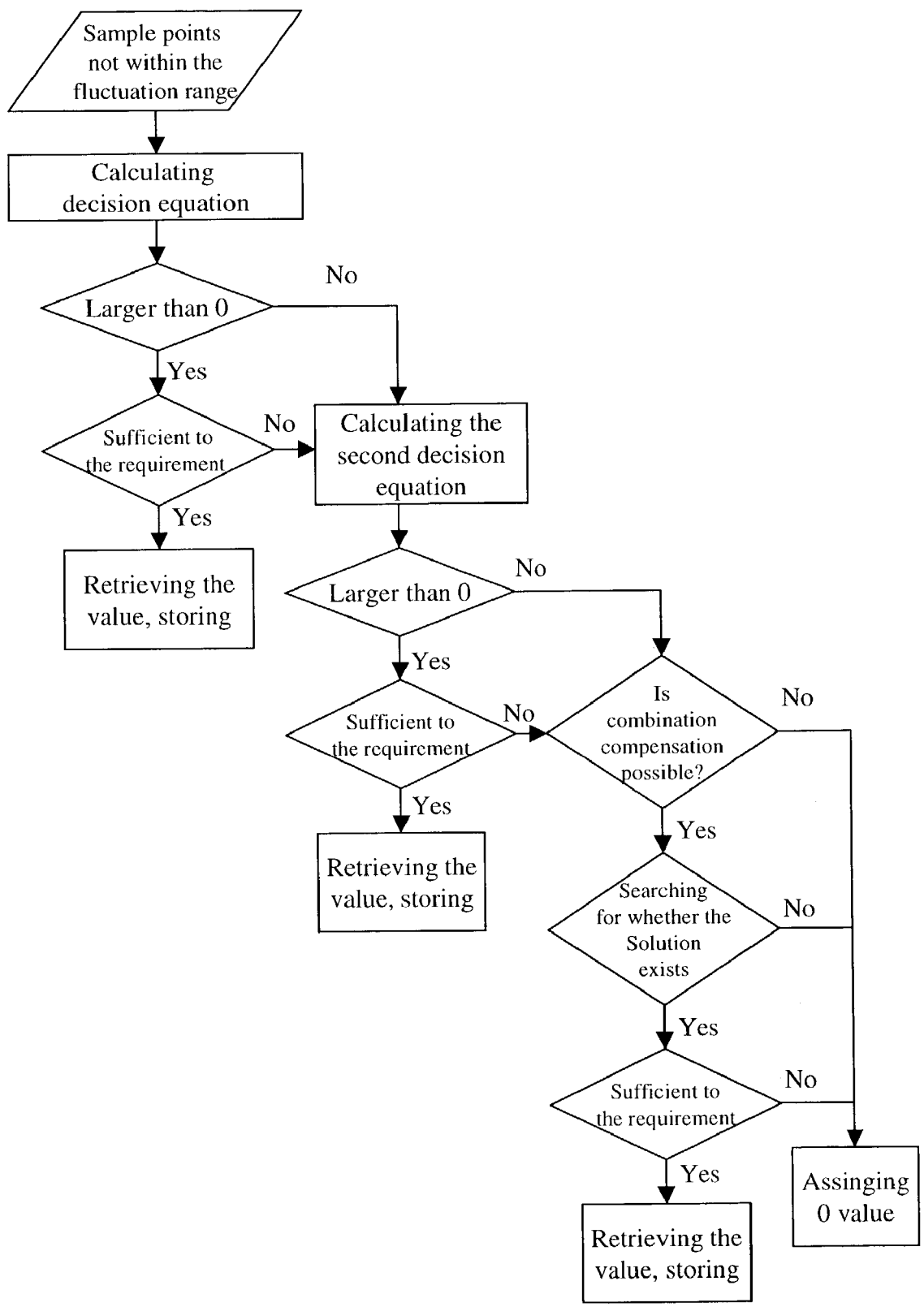
FIG. 3 is a flow chart of a method of calculating and searching to obtain a compensation signal in accordance with the principles of the present invention.

As shown in FIG. 3, the step of performing calculation and search to obtain the compensation signal in the method comprises the steps of:

1) determining whether value of each sample point of the combination signal is within a predetermined permitted range, wherein for a constant envelope compensation, the predetermined permitted range is within a range of ±5% of a constant envelope value, and for the other compensations, the only requirement for the predetermined permitted range is that an absolute value of the sample point is smaller than a maximum value; for the sample point of the combination signal that is within the predetermined permitted range, assigning 0 to the value of the sample point of the corresponding compensation signal; and for the sample point of the combination signal that is not within the predetermined permitted range, the following calculation is performed;

2) calculating a first compensation signal to decide whether there is a solution, if there is, then using the first compensation signal as the resultant compensation signal to be summed with the combination signal for producing the compensated signal;

3) If there is no solution for the first compensation signal, then calculating a second compensation signal to decide whether there is a solution, if there is a solution, then using the second compensation signal as the resultant compensation signal to be summed with the compensation signal for producing the compensated signal;

4) If there is still no solution for the second compensation signal, then it is decided firstly whether the combination compensation is possible, if it is possible, a searching algorithm is used for solving.

5) If the combination compensation is impossible, or effective solutions have not been found, then setting the amplitude of the two signals to be 0, that is, compensation is not performed.

If a negative solution is allowed, then: if there is still no solution for the second compensation signal, combination compensation will be performed.

The searching steps in the above procedure for combination compensation include: changing an amplitude of the compensation signal of one of the carriers according to a predetermined step in a specified range and calculating simultaneously to determine whether there is a solution for another compensation signal. If there is a solution, then the another compensation signal is used as the resultant compensation signal to be summed with the combination signal to produce the compensated signal, and the combination compensation via the searching method is complete. If there is no solution, then the combination compensation via the search method continues until the amplitude of the compensation signal exceeds the range.

The compensation signal employed is an amplitude modulation signal, the compensation signal is solved and retrieved by way of solving the equation. When the solution of the compensation signal is a negative solution, it means that the signal is not a simple amplitude modulation signal, but an amplitude modulation and phase modulation signal. When solving the compensation signal in the present algorithm, only positive solutions are retrieved.

The algorithm for deciding the effectiveness of the combination compensation includes:

calculating the phases of the combination vector and the compensation signal vector of the first carrier at a certain sampling time; and calculating the phases of two reverse vectors;

if the phase of the compensation signal of the second carrier is placed between the two reverse vectors, then combination compensation can be performed; otherwise, the combination compensation is impossible.

The algorithm for deciding the effectiveness of the combination compensation is implemented by using a vector analyzing method. The main idea is as follows:

The multi-carrier signals can be equivalent to a signal vector on a I-Q plane, the modulo of the vector is $\sqrt{I^2(t)+Q^2(t)}$, and the phase can also be determined by Q(t), I(t); and the compensation signal y(t) can be expressed by a vector rotating at a counter-clock direction, the rotating angular velocity of which is $\Delta f$, and the modulo is a(t).

Figure 4:
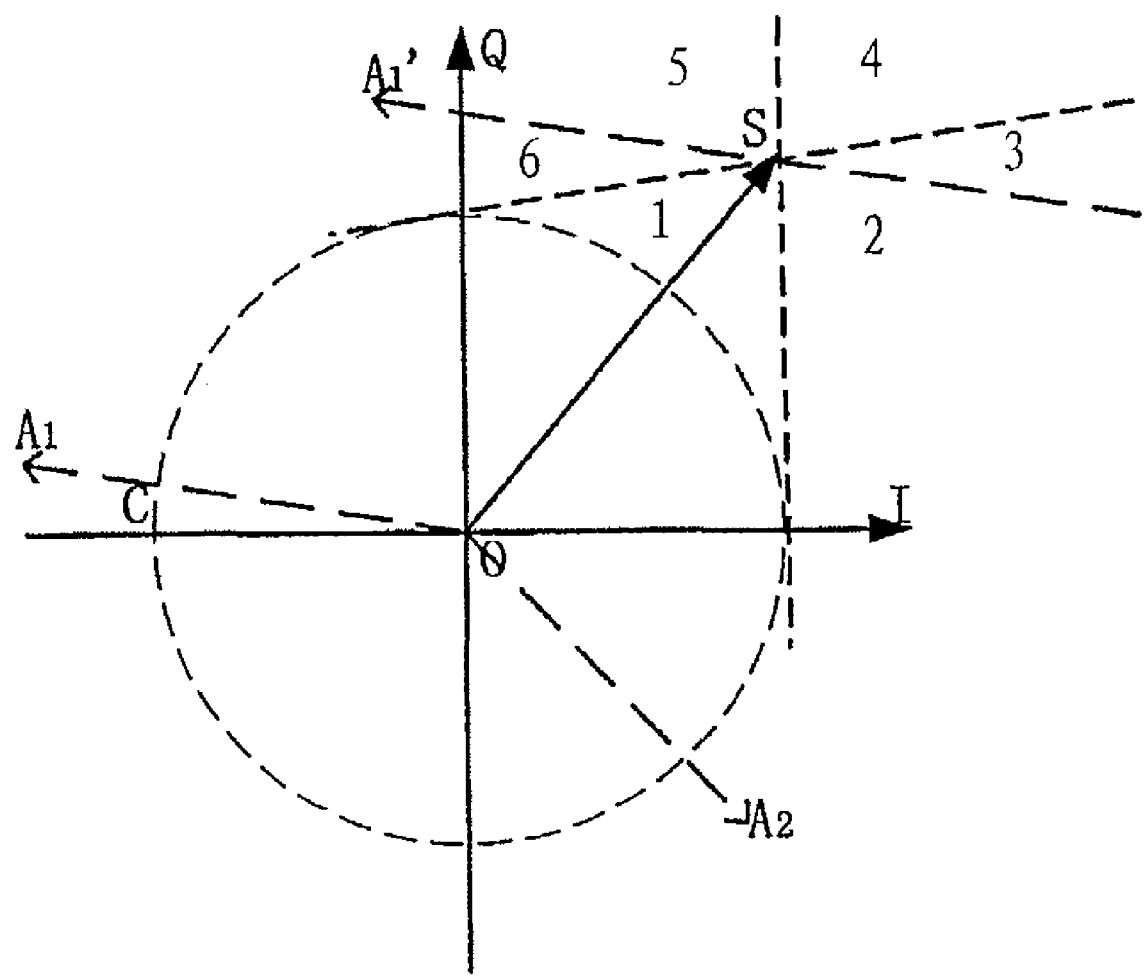
FIG. 4 is a schematic illustration of compensation represented by vectors in accordance with the principles of the present invention.

The radial of a circle in FIG. 4 represents the size of the required constant envelope under a constant envelope compensation condition and represents the maximum value of the permitted combination signal envelope under a non-constant envelope compensation condition.

When the combination compensation of two signals is used, the condition is rather complicated, it is difficult for deducing the conclusion by a method using mathematics. By using a method for signal analysis, after researching and testing, it is generalized a condition that there is no positive solution when combination compensation. The conclusion can be generalized as:

When the compensation signal vector of the second carrier falls within a region sandwiched between the reverse vector of the compensation signal of the first carrier and the reverse vector of the original signal vector, the combination compensation can be performed; otherwise, the combination compensation is impossible. However, the compensation can be performed by using the reverse vector of the compensation signal. Under such situation, it is considered that it corresponds to that the phase of the compensation signal skips 180 degree. Thus, the compensation signal includes a phase modulation component. Under a condition that the reverse vector is taken into consideration, the compensation can be realized by using the compensation signals of two carriers in all of the conditions (see the substantial analysis in FIG. 4).

In FIG. 4, the plane is divided by the compensation signal vector of the first carrier ($\rightarrow SA_1$) and its reverse vector, the multi-carrier signals vector ($\rightarrow OS$), and two tangent lines at its ends into six regions. If there is a compensation signal in regions 1 and 4, then the compensation can be performed (if it is in region 4, then the reverse vector of which is used for compensating). If the vector of the second compensation signal is in regions 2 and 5, then the combination compensation is performed with ($\rightarrow OA_1$). If the second vector is in regions 3 and 6, then the combination compensation is performed with the reverse vector of ($\rightarrow OA_1$). Thus, the compensation can be realized by using two compensation signals in all of the conditions.

After the compensation, some points without a solution, or a few of the points with bad compensation results, may still exist. The ratio of peak power to average power can be reduced to a required range by performing waveform clipping at this time. While there are a few of such points, the in-band noise caused by the waveform clipping is small.

INDUSTRY APPLICABILITY

A method for reducing the ratio of peak power to average power of signals by incorporating probabilistic waveform clipping and out-of-band compensation is provided by the invention. The signals are compensated firstly by a compensation signal, and the compensation signal is obtained previously by calculating and searching specifically. After adding the compensation signal, the amplitude for waveform clipping is selected properly to perform the waveform clipping for the signals and to obtain better function. Thus, the problem that the ratio of peak power to average power of signals is impossible to improve caused by no solution of the compensation signal can be resolved by the invention. While the in-band effect on the signals will not be as large as that of the simple waveform clipping, under the premise of ensuring the quality of the signals, the ratio of peak power to average power of the signals are reduced to a great extent. Meanwhile, the efficiency of using the radio frequency amplifier is improved, and the cost of the system is decreased.

What is claimed is:

1. A method for reducing a ratio of peak power to average power of multi-carrier signals, comprising the steps of:
    modulating the multi-carrier signals;
    summing modulated multi-carrier signals to form a combination signal;
    performing compensation by computing and searching on at least one of carriers based on the combination signal to obtain a resultant compensation signal, the step of performing compensation further comprising:
    determining whether each value of each sample point of the combination signal is within a predetermined permitted range, wherein for a constant envelope compensation, the predetermined permitted range is within a range of ±5% of a constant envelope value, and for other compensations, only requirement for the predetermined permitted range is that an absolute value of the sample point is smaller than a maximum value; for the sample point of the combination signal that is within the predetermined permitted range, assigning 0 to the value of the sample point of the corresponding compensation signal; and for the sample point of the combination signal that is not within the predetermined permitted range, the following calculation is performed:
    a) calculating a first compensation signal to decide whether there is a value, if there is, then using the first compensation signal as the resultant compensation signal to be summed with the combination signal for producing a compensated signal;
    b) if there is no value for the first compensation signal, then calculating a second compensation signal to decide whether there is a value, if there is a value, then using the second compensation signal as the resultant compensation signal to be summed with the compensation signal for producing the compensated signal; and
    c) if there is still no value for the second compensation signal, then performing a combination compensation via a searching method to produce the resultant compensation signal; and
    summing the resultant compensation signal with the combination signal to produce the compensated signal.

2. The method of claim 1, wherein the method further comprises the steps of:
    performing probabilistic waveform clipping on the compensated signal by selecting an amplitude for waveform clipping; and
    outputting a standard signal.

3. The method of claim 2, wherein the combination compensation via the searching method includes the step of:
    changing an amplitude of the compensation signal of one of the carriers according to a predetermined step in a specified range and calculating simultaneously to determine whether there is a value for another compensation signal: if there is a value, then the another compensation signal is used as the resultant compensation signal to be summed with the combination signal to produce the compensated signal, and the combination compensation via the searching method is complete; and if there is no value, then the combination compensation via the searching method continues until the amplitude of the compensation signal exceeds the range.

4. The method of claim 1, wherein the combination compensation via the searching method comprises the step of:
    calculating phases of a vector of the combination signal and a vector of the compensation signal of a first carrier at a certain sampling time; and
    calculating phases of two reverse vectors: if the phase of the compensation signal of a second carrier is positioned between the two reverse vectors, then using the compensation signal of the second carrier as the resultant compensation signal to be summed with the combination signal to produce the compensated signal; otherwise, using a reverse signal of the compensation signal of the second carrier as the resultant compensation signal to be summed with the combination signal to produce the compensated signal.

5. The method of claim 1, wherein the compensation signal is an amplitude modulation and phase modulation signal.

6. An apparatus for reducing a ratio of peak power to average power of multi-carrier signals, comprising:
a modulator for modulating respectively input multi-carrier signals and outputting modulated signals;
a combiner for receiving and summing the modulated signals to form a combination signal for outputting;
a compensation generator for receiving the combination signal from the combiner to calculate and search at least one carrier to form a compensation signal for outputting, wherein the compensation generator is further configured for:
determining whether value of each sample point of the combination signal is within a predetermined permitted range, wherein for a constant envelope compensation, the predetermined permitted range is within a range of ±5% of a constant envelope value, and for other compensations, only requirement for the predetermined permitted range is that an absolute value of the sample point is smaller than a maximum value; for the sample point of the combination signal that is within the predetermined permitted range, assigning 0 to the value of the sample point of the corresponding compensation signal; and for the sample point of the combination signal that is not within the predetermined permitted range, the following calculation is performed:
a) calculating a first compensation signal to decide whether there is a value, if there is, then using the first compensation signal as the resultant compensation signal to be summed with the combination signal for producing a compensated signal;
b) there is no value for the first compensation signal, then calculating a second compensation signal to decide whether there is a value, if there is a value, then using the second compensation signal as the resultant compensation signal to be summed with the compensation signal for producing the compensated signal; and
c) if there is still no value for the second compensation signal, then performing a combination compensation via a searching method to produce the resultant compensation signal; and
a summer for receiving and summing respectively the combination signal from the combiner and the compensation signal from the compensation generator and outputting the compensated signal.

7. The apparatus of claim 6, further comprising:
a probabilistic waveform clipper for receiving the compensated signal from the summer, selecting properly an amplitude for waveform clipping to perform probabilistic waveform clipping for the compensated signal, and outputting finally a standard signal.

8. A method for reducing a ratio of peak power to average power of multi-carrier signals, comprising the steps of:
modulating the multi-carrier signals;
summing modulated multi-carrier signals to form a combination signal;
performing compensation by computing and searching on at least one of carriers based on the combination signal to obtain a resultant compensation signal; the step of performing compensation further comprising:
determining whether value of each sample point of the combination signal is within a predetermined permitted range, assigning 0 to the value of the sample point of the corresponding compensation signal; and for the sample point of the combination signal that is not within the predetermined permitted range, the following calculation is performed:
a) calculating a first compensation signal to decide whether there is a value, if there is, then using the first compensation signal as the resultant compensation signal to be summed with the combination signal for producing a compensated signal;
b) if there is no value for the first compensation signal, then calculating a second compensation signal to decide whether there is a value, if there is a value, then using the second compensation signal as the resultant compensation signal to be summed with the compensation signal for producing the compensated signal; and
c) if there is still no value for the second compensation signal, then performing a combination compensation via a searching method to produce the resultant compensation signal; and
summing the resultant compensation signal with the combination signal to produce the compensated signal.

9. The method of claim 8, wherein the method further comprises the steps of:
performing probabilistic waveform clipping on the compensated signal by selecting an amplitude for waveform clipping; and
outputting a standard signal.

10. The method of claim 8, wherein the combination compensation via the searching method includes the step of:
changing an amplitude of the compensation signal of one of the carriers according to a predetermined step in a specified range and calculating simultaneously to determine whether there is a value for another compensation signal: if there is a value, then the another compensation signal is used as the resultant compensation signal to be summed with the combination signal to produce the compensated signal, and the combination compensation via the searching method is complete; and if there is no value, then the combination compensation via the searching method continues until the amplitude of the compensation signal exceeds the range.

11. The method of claim 8, wherein the combination compensation and searching step comprises the step of:
calculating phases of a vector of the combination signal and a vector of the compensation signal of a first carrier at a certain sampling time; and
calculating phases of two reverse vectors: if the phase of the compensation signal of a second carrier is positioned between the two reverse vectors, then using the compensation signal of the second carrier as the resultant compensation signal to be summed with the combination signal to produce the compensated signal; otherwise, using a reverse signal of the compensation signal of the second carrier as the resultant compensation signal to be summed with the combination signal to produce the compensated signal.

12. The method of claim 8, wherein the compensation signal is an amplitude modulation and phase modulation signal.

13. An apparatus for reducing a ratio of peak power to average power of multi-carrier signals, comprising:
a modulator for modulating respectively input multi-carrier signals and outputting modulated signals;
a combiner for receiving and summing the modulated signals to form a combination signal for outputting;

a compensation generator for receiving the combination signal from the combiner to calculate and search at least one carrier to form a compensation signal for outputting; wherein the compensation generator further being configured for:

determining whether value of each sample point of the combination signal is within a predetermined permitted range, assigning 0 to the value of the sample point of the corresponding compensation signal; and for the sample point of the combination signal that is not within the predetermined permitted range, the following calculation is performed:

a) calculating a first compensation signal to decide whether there is a value, if there is, then using the first compensation signal as the resultant compensation signal to be summed with the combination signal for producing a compensated signal;

b) if there is no value for the first compensation signal, then calculating a second compensation signal to decide whether there is a value, if there is a value, then using the second compensation signal as the resultant compensation signal to be summed with the compensation signal for producing the compensated signal; and c) if there is still no value for the second compensation signal, then performing a combination compensation via a searching method to produce the resultant compensation signal; and a summer for receiving and summing respectively the combination signal from the combiner and the compensation signal from the compensation generator and outputting the compensated signal.

* * * * *